Figure 1:
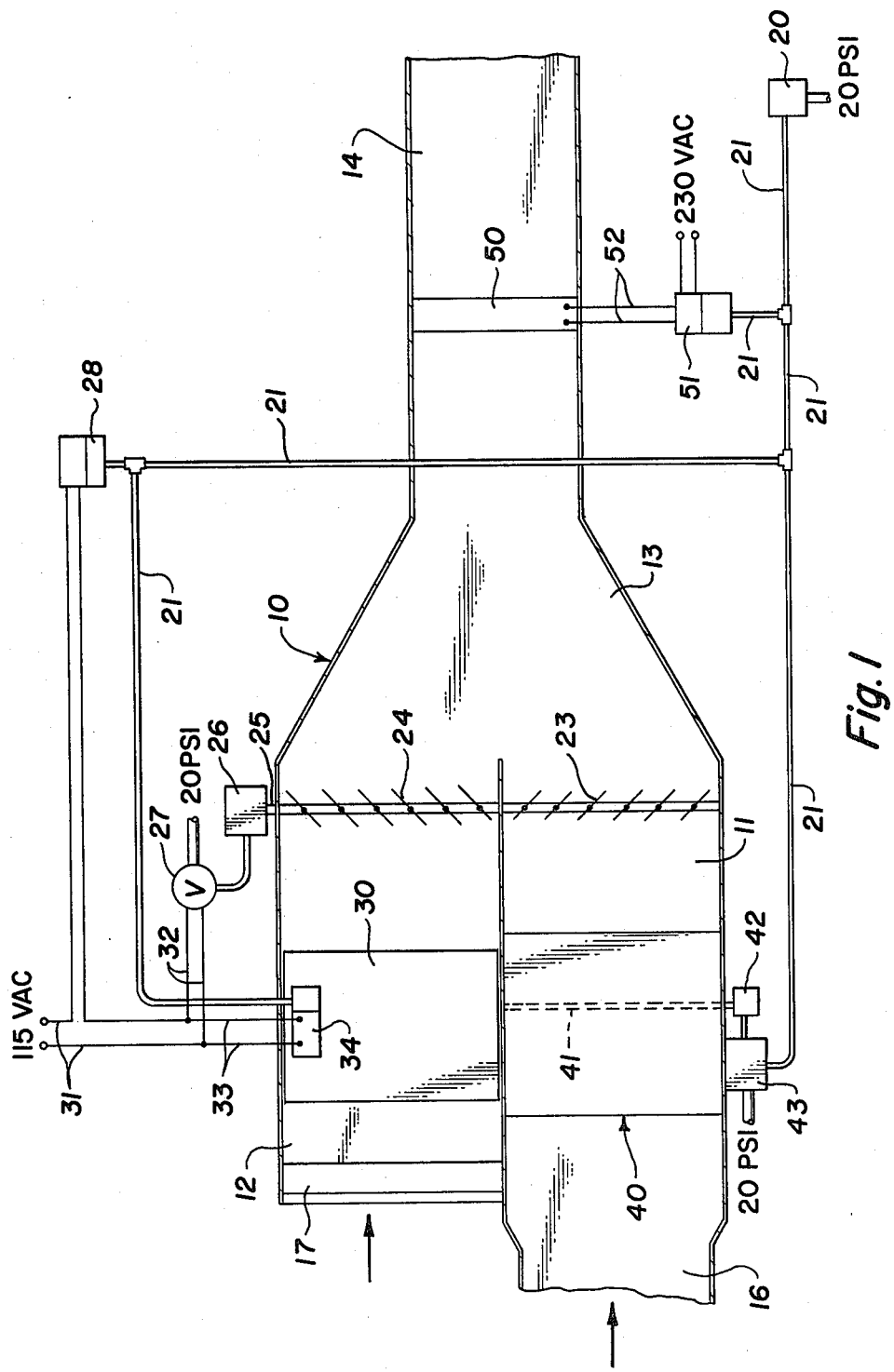

United States Patent [19]

Ammons et al.

[11] 4,294,403
[45] Oct. 13, 1981

[54] SYSTEM AND METHOD FOR CONTROLLING THE CONDITIONING AND DELIVERY OF AIR TO A CONDITIONED SPACE

[76] Inventors: Staron E. Ammons, P.O. Box 17128, Dallas, Tex. 75217; Edwin L. Paschall, P.O. Box 35226, Dallas, Tex. 75235; Morris G. Carter, P.O. Box 17128, Dallas, Tex. 75217

[21] Appl. No.: 170,996

[22] Filed: Jul. 21, 1980

Related U.S. Application Data

[63] Continuation-in-part of Ser. No. 958,961, Nov. 9, 1978, abandoned.

[51] Int. Cl.³ ............................................. G05D 23/13
[52] U.S. Cl. ....................................... 236/13; 165/27; 236/49
[58] Field of Search ..................... 236/13, 49; 165/27, 165/16; 98/38 D

[56] References Cited

U.S. PATENT DOCUMENTS

| | | | |
|---|---|---|---|
| 2,331,476 | 10/1943 | Jones | 236/13 X |
| 2,712,927 | 7/1955 | Blum | 236/13 X |
| 2,764,354 | 9/1956 | Peterson et al. | 236/13 X |
| 3,026,041 | 3/1962 | Jentoft | 236/13 |
| 3,030,024 | 4/1962 | Joesting | 236/13 |
| 3,613,548 | 10/1971 | Motts et al. | 236/13 X |
| 3,768,729 | 10/1973 | Dean, Jr. | 236/13 |
| 3,809,314 | 5/1974 | Engelke et al. | 236/49 |
| 4,106,552 | 8/1978 | Hufford | 165/27 X |
| 4,109,704 | 8/1978 | Spethmann | 165/16 |

*Primary Examiner*—William E. Tapolcai, Jr.
*Attorney, Agent, or Firm*—Peter J. Murphy

[57] ABSTRACT

Air flows to the conditioned space through a cool air duct and a warm air duct which feed a common delivery duct. The inlet of the cool air duct is connected to a cool air supply duct of a parent system; and inlet of the warm air duct communicates with the return air plenum. Flow control components are air actuated and are controlled by actuators responding to a varying air pressure control signal, which is the output of a thermostat in the conditioned space producing a varying signal pressure signal related to varying temperatures. Dampers in the cool air duct and warm air duct provide for alternative air flow from either of these ducts to the delivery duct. The volume of air flow in the cool air duct is controlled by a modulating damper which responds to a selected signal pressure range. The air flow in the warm air duct is controlled by a fan and dampers, controlled through change of the signal pressure in either direction relative to a selected signal level. An electric heater in the delivery duct is energized and de-energized in response to change of the signal pressure in either direction relative to another selected signal level, whereby this heater is energized only in conjunction with air flow through the warm air duct.

19 Claims, 2 Drawing Figures

SYSTEM AND METHOD FOR CONTROLLING THE CONDITIONING AND DELIVERY OF AIR TO A CONDITIONED SPACE

This application is a continuation-in-part of application Ser. No. 958,961, filed Nov. 9, 1978, now abandoned.

BACKGROUND AND SUMMARY OF THE INVENTION

This invention relates to controlling the conditioning and delivery of air to a space or zone to be conditioned, such as a selected portion or zone of an office building.

The invention is particularly concerned with a subsystem which is part of a larger parent system, where the parent system provides cooled or chilled air to a plurality of subsystems which control the conditioning of adjacent zones on one building floor, for example. For such parent system, a central cooling coil and associated distribution system may supply the cooled air to the several zones of the office building floor, and a separate subsystem will then control the conditioning and distribution of the air to each of the respective zones. In the following specification, reference to a conditioned space refers to a space or zone which may consist of one or more individual rooms, and which is to be conditioned by one subsystem according to the invention. For both the parent system and the associated subsystems, the return air plenum is desirably the "attic space" between the under surface of the building floor structure and the ceiling of the floor space immediately below. References to "return plenum" in the following specification are intended to refer to such return air plenum.

The invention is concerned with a system and method for controlling the conditioning and delivery of air to a conditioned space in a manner which is most efficient from the standpoint of energy consumption. Energy waste is minimized by (1) eliminating any mixing of previously cooled air with previously heated air, (2) utilizing only the volume of precooled air which is necessary to maintain the desired space temperature, and (3) minimizing the use and size of air moving fans which require energy.

A principal object of this invention is to provide a system and method for controlling the temperature of air in a conditioned space, in a manner to minimize energy waste.

A more particular object of this invention is to provide a system and method for controlling the temperature of air in a conditioned space, without mixing the precooled air with warmer air prior to delivery to the conditioned space, thereby minimizing energy waste.

Another object of this invention is to provide an efficient system and method for controlling the conditioning and delivery of air to a conditioned space.

A further object of this invention is to provide an effective and efficient system and method for controlling the conditioning and delivery of air to various conditioned spaces or zones of a building, which spaces or zones have different conditioning demands.

Still another object of this invention is to provide a system and method for conditioning and delivering air to conditioned spaces of a building, which minimize the need for, and the utilization of, auxiliary air moving fans and thereby further minimize energy waste.

A system for accomplishing these objects includes a cool air duct for connection to a cool air supply duct, a warm air duct for communication with a return plenum, and a delivery duct connected to both the cool air and warm air ducts for delivering air to the conditioned space. A thermostat control device provides a varying control signal relating to the varying temperature of the air in the conditioned space. Damper means for the warm air allows air flow from the return plenum to the delivery duct and prevents reverse flow therein. A fan is disposed in the warm air duct for effecting air flow from the return plenum to the delivery duct. Variable flow control damper means is disposed in the cool air duct for varying the air flow therein between maximum and no flow conditions. A first actuator means is responsive to the thermostat signal for controlling the variable flow control damper means; and a second actuator means is responsive to the thermostat signal for controlling the damper means and the fan. The second actuator means is operative in one condition to start the fan simultaneously with the closing of the cold air duct damper means, and is operative in another condition to stop the fan simultaneously with the opening of the cold air duct damper means. In more detail a heating device is disposed in the delivery duct; and a third actuator means is responsive to the thermostat signal for controlling the heating device.

DRAWING

Figure 2:
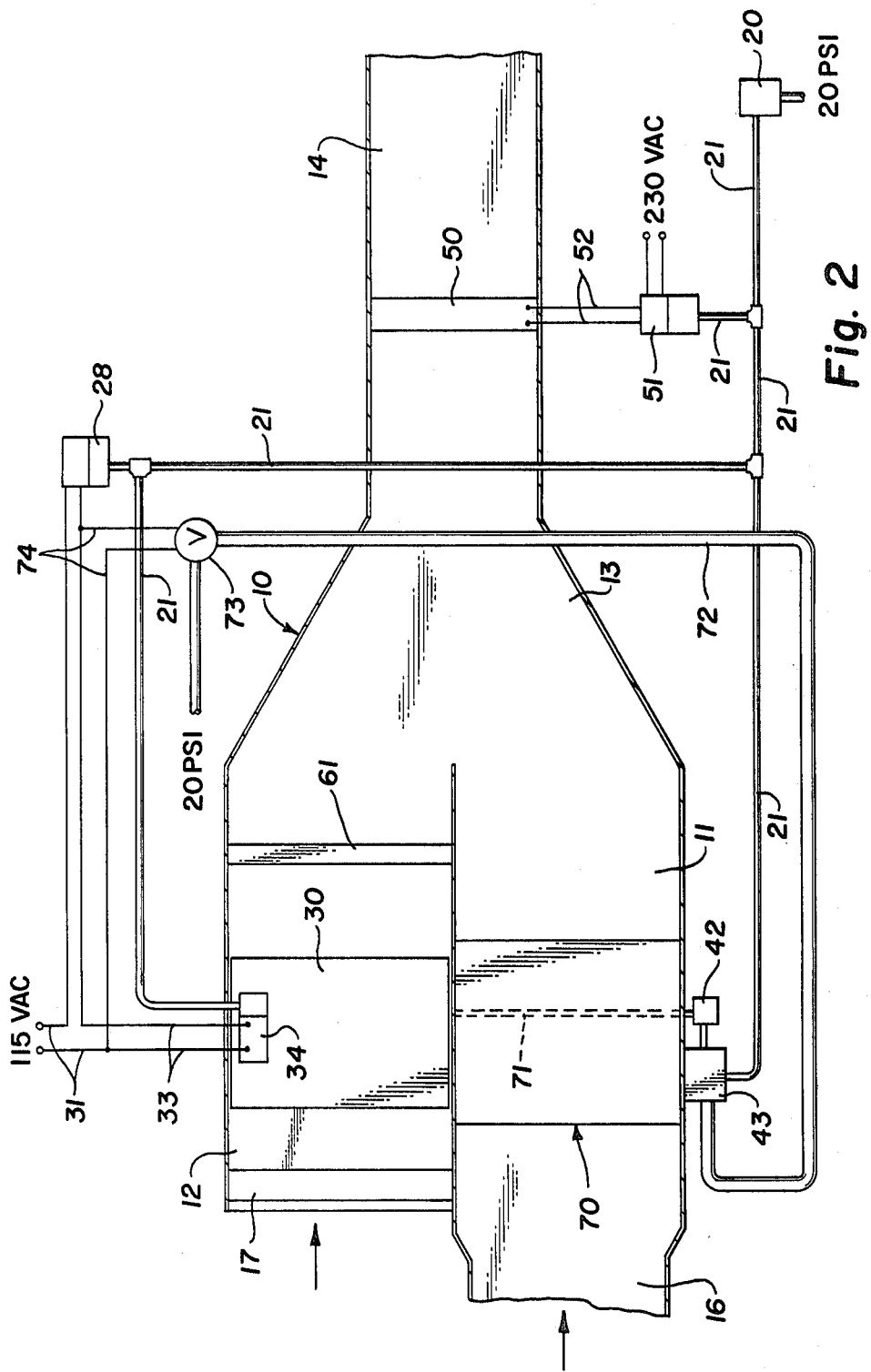

FIG. 1 is a diagrammatic and schematic illustration of one form of subsystem according to the invention; and FIG. 2 is a diagrammatic and schematic illustration of another form of subsystem according to the invention.

DESCRIPTION OF THE FIG. 1 EMBODIMENT

Referring to the drawing, one form of subsystem according to the invention consists basically of a structural sheet metal unit 10 including a cool air duct portion 11, a parallel warm air duct portion 12, a delivery duct portion 14, and a coupling section 13 providing for the flow of air from either the cool air duct or the warm air duct to the delivery duct. The delivery duct may supply a plurality of diffusers in the conditioned space. The inlet of the cool air duct is connected to a cool air supply duct 16, which supplies chilled air from a parent system. The inlet of the warm air duct is open to the return plenum. In a typical installation the entire unit 10 will be mounted within the return plenum. The illustrated unit 10 is so mounted; and the warm air duct 12 has an open inlet end spanned by a suitable air filter 17. The air controlled by this subsystem is that supplied from either the cool air supply duct 16 or the return plenum, and is further conditioned only by additional heating in a manner to be described.

The temperature of the conditioned space is monitored by a thermostat control device 20 which produces a varying control signal responsive to the varying temperature in that space. The system 10 which is illustrated and described is a pneumatically controlled system which responds to signal pressures in the range of from 0 to 20 psi. The system also includes pneumatic motors which require operating air supplied at 20 psi. The system thermostat 20 also requires a supply of 20 psi air, and produces an output signal pressure which may range from 0 to 20 psi. The thermostat may be calibrated so that the following selected signal pressures are maintained when the following temperatures correspond to the space temperature:

3 psi 72° F.
6 psi 73° F.
9 psi 74° F.
12 psi 75° F.
15 psi 76° F.

When the thermostat calls for heat the signal pressure will be reduced; and when the thermostat calls for cooling the signal pressure will be increased. References in this specification to particular temperatures, signal pressures, and control pressures are by way of example only. The thermostat and actuators may be calibrated as desired according to job requirements.

Referring now to the components of the control system, a discharge damper unit consists of coupled discharge dampers 23 and 24, disposed adjacent to the outlet ends of the cool air duct 11 and warm duct 12 respectively. Preferably these discharge dampers are mechanically coupled together, as indicated diagrammatically by a common actuator shaft, and are actuated by a common two-position pneumatic motor 26. The discharge dampers are coupled together in a manner that: when the cool air duct damper 23 is fully open, the warm air duct damper 24 is closed; and when the cool air duct damper 23 is closed the warm air duct damper 24 is open. The motor positions the dampers selectively in either of the two alternative conditions; and this provides for alternative flow of air only either from the cool air duct or the warm air duct to the delivery duct 14. The pneumatic motor 26 is controlled by a solenoid operated valve 27, which may be a three-way valve or a four-way valve, depending on the type of motor employed. The solenoid valve 27 is, in turn, controlled by a pneumatic-electric switch 28 connected to the output of thermostat 20. This switch is in an electric control circuit to be described.

A fan or blower 30 is mounted in the warm air duct 12 for effecting air flow when the discharge damper 24 is open. This fan 30 may be powered by a 115 volt motor, for example, having a pneumatically operated two-speed control 34. The control circuit for the fan consists of input conductors 31 controlled by the switch 28, and parallel connected branch conductors 32 and 33 connected to the valve 27 and blower 30, respectively. It will be seen that the switch 28 and associated circuit controls the dampers 23, 24 and the blower 30 simultaneously. The fan 30 is turned on simultaneously with the opening of the warm air duct damper 24 (and the closing of the cool air duct damper 23); and the blower is turned off simultaneously with the closing of the warm air duct damper (and the opening of the cool air duct damper). The switching function is set to occur at a signal pressure of 7 psi, that is, when the signal pressure goes below 7 psi the switch is closed to effect air flow through the warm air duct, and when the signal pressure rises above 7 psi the switch is opened to effect air flow through the cool air duct.

The speed control switching function is set to occur at a signal pressure of 5.5 psi; that is, when the signal pressure goes below 5.5 psi the speed control 34 effects high fan speed, and when the signal pressure rises above 5.5 psi the speed control effects low fan speed.

A variable volume flow control unit 40 is provided in the cool air duct 11 for varying the volume of cool air flow in accordance with cooling demand. Such unit may be a prepackaged unit; and a preferred form of such unit is identified as Enviro-Master ESV-3000 series unit, described in the catalog of Environmental Elements Corporation, Catalog H-120-1 2-77-Printed in U.S.A. This unit may simply vary the flow of air through the cool air duct 11 by means of a variable flow damper controlled in response to signal pressures from the thermostat 20, or the unit may provide an additional function of controlling the variable flow damper in response to changing flow conditions. References herein to "changing flow conditions" refer to changes in static pressure and velocity pressure, effected primarily by changes in the pressure of chilled air supplied at the cool air supply duct 16 by the parent system. With this type of additional control, the same volume of air flow is maintained through the cool air duct 11 even though the supply pressure in the cool air supply duct 16 might fluctuate. The above mentioned ESV-3000 unit provides such control which is referred to as "pressure independent control".

The variable control unit 40 includes a variable flow damper 41 for regulating the flow through the cool air duct 11, and which is controlled by a modulating pneumatic motor 42. The modulating motor 42 is calibrated to move the damper between a maximum flow limit (full open) and a minimum flow limit (50% of full open). These limits may be set according to the particular installation requirements.

The motor 42 is controlled by actuator 43 which is connected to the output of the thermostat 20, and is also connected to a source of air at 20 psi for driving the motor. For selected control of the damper 41, the actuator is adjusted to open the damper to the full open position in response to a signal pressure of 13 psi or higher and to reduce the damper toward the 50% minimum limit position when the signal pressure decreases to 8 psi, for example. At 8 psi or lower, the damper is maintained in the minimum limit position. The actuator 43 may respond additionally to changing flow conditions within the unit 40, and further regulate the damper 41 to compensate for changes in the supply pressure. Accordingly, when the damper 41 is set by the thermostat at a position other than the maximum or minimum flow condition, the volume of air flow will be constant and independent of the supply pressure in the cool air supply duct 16.

For supplying heat in addition to that which can be supplied from the return plenum, a heating unit 50 is mounted within the delivery duct 14 for further heating the air supplied from the warm air duct 12. In the illustrated system, this heating unit is an electric heating unit operating from a 230 volt power supply, and controlled by actuator 51 in the form of a pneumatic electric switch connected to the heater by conductors 52. This switch is adjusted to respond to a switch over pressure of 4.5 psi, the switch being closed when the signal pressure goes below 4.5 psi to turn on the heater 50, and the switch being opened when the thermostat signal pressure goes above 4.5 psi to turn off the heater.

OPERATION OF THE FIG. 1 EMBODIMENT

The above described subsystem operates in the following manner. Assuming that the thermostat 20 is calling for full cooling, the signal pressure will be 15 psi or higher. The cool air duct discharge damper 23 is open and the variable flow damper 41 is at the maximum limit position. The full volume of cool air from the cool air supply duct 16 then passes to the conditioned space.

Assuming that the thermostat calls for heat (relative to the maximum cool condition) the signal pressure may drop to 11 psi, for example. At this pressure, the actuator 43 will operate motor 42 to close the variable flow damper 41 to reduce the flow of cool air. Assuming that the actuator 43 is part of a pressure independent system, the actuator will then continuously vary the variable flow damper 41 in response to changing flow conditions in the unit 40, to maintain a constant volume of air flow to the conditioned space. With this type of control, the system responds more accurately to the thermostat signal.

Assuming that the thermostat calls for still more heat wherein the signal pressure reduces to 7.5 psi, for example, the variable flow damper 41 will be reduced to its minimum flow condition wherein a much reduced flow of cool air is supplied to the conditioned space, thereby allowing the space temperature to rise.

Assuming that the thermostat calls for still further heat, the signal pressure may reduce to 6 psi, for example. When the pressure decreases below 7 psi, the switch 28 is closed to start the blower 30, and to shift the discharge dampers 23 and 24 to the condition wherein the warm air duct is open and the cool air duct is closed. At this signal pressure, the speed control 34 is in the low speed condition; and a lower volume of air from the return plenum is now delivered to the conditioned space. The temperature of this air will be determined by the heat absorbed during circulation from lighting, mechanical equipment, and other sources; that is heat generated within the conditioned space or other spaces of the building for which the return plenum is a common return. With a further call for heat, resulting in a signal pressure reduction to below 5.5 psi, the speed control 34 will shift the blower to the high speed condition where a higher volume of air is then delivered.

Where this building generated heat is not sufficient to meet the heat demand, the signal pressure will be reduced further to 3 psi, for example. When the signal pressures moves below 4.5 psi, the switch 51 is closed to energize the electric heater 50 and supply additional heat to the air delivered through the delivery duct 14.

When the system calls for cooling rather than for heat, the reverse of the above described functions will occur. When the thermostat signal pressure moves above 4.5 psi the switch 51 will be opened to de-energize heater 50. When the pressure moves above 7 psi, the switch 28 will be opened to shut off the blower 30 and effect shifting of the discharge dampers to close the warm air duct 12 and open the cool air duct 11. The flow of cool air from the cool air duct will then begin at the minimum limit rate determined by the minimum flow condition of the variable flow damper 41. When the thermostat calls for additional cooling, the actuator 43 will respond to an increasing signal pressure between 8 and 15 psi to gradually open the variable flow damper, until the control signal exceeds 13 psi and the damper is set at the full open position. This then is the maximum cooling condition and further increase in signal pressure cannot increase flow.

For any selected thermostat temperature setting, when the temperature in the space reaches the set temperature the thermostat signal pressure will be stabilized. For example, assuming the thermostat is set to maintain 74° F., and the space temperature achieves 74° F., the signal pressure will be stabilized at 9 psi. Assume for example that the temperature drops slightly below 74° F., the signal pressure will reduce correspondingly to 8 psi, for example, which would effect closing of the variable flow damper 41 to reduce the cool air flow. With the lower volume of cool air supplied the space temperature will return to 74° F. Should the space temperature increase to 75° F., the signal pressure will increase correspondingly to effect further opening of the variable flow damper to increase cool air flow and return the space to the selected temperature.

DESCRIPTION OF THE FIG. 2 EMBODIMENT

FIG. 2 of the drawing illustrates another form of subsystem, according to the invention, which is quite similar to that of FIG. 1 and which functions essentially in the same manner, but which includes several different components. In FIG. 2 the components of the system which are identical to those of FIG. 1 are identified by the same reference numbers. The principal difference in the FIG. 2 subsystem is that the coupled discharge dampers 23 and 24, and the associated controls, of the FIG. 1 embodiment are eliminated; and this damper unit is replaced by other damper structures and other controls, with this alternative subsystem functioning overall in the same manner as the FIG. 1 system, and providing the same advantages with the additional advantage of a less complicated system and therefore some manufacturing economy.

Referring to the warm air duct 12, the damper 24 is replaced by a backdraft damper 61 which is disposed within the duct and controls the flow of air through the duct from the plenum to the delivery duct 14. This backdraft damper is automatic in operation allowing air flow in the indicated direction when the fan 30 is turned on, and preventing air flow in a reverse direction when the fan is turned off since the damper will be closed automatically through gravity operation and also back pressure in the discharge duct will assist in maintaining the closure of the back flow damper. The back pressure will of course be created by the flow of air from the cool air duct 11.

Referring now to the cool air duct, a variable volume flow control unit 70 is provided in this duct for varying the volume of cool air flow in accordance with cooling demand. This unit may be identical to the unit 40 described in the FIG. 1 embodiment, with the additional structural feature that the variable flow damper 71, which regulates the flow of air through the unit, is spring biased to a normally closed position. This damper 71 is modulated by the actuator 43 and motor 42 in the same manner as the damper 41 to adjust the flow between maximum (full open) flow and minimum (fifty percent or less of full open); however the unit is designed that when the 20 psi source air for driving the motor 42 is removed or shut off, the damper 71 will revert to the normally closed position by the spring action. This 20 psi source air is supplied through the conduit 72 and solenoid operated valve 73 which may be a three-way valve for example. The solenoid valve 73 is connected into the electric circuit controlled by the pneumatic-electric switch 28, by means of conductors 74. This actuator 28 controls the turning on and off of the fan 30 in the warm air duct and simultaneously controls the opening and closing of the valve 73. The actual function is that the valve 73 will be switched to the vent position when the fan 30 is turned on, so that the damper 71 moves to the closed position. This, then, prevents the mixing of cool air from the cool air duct 11 with the warm air from the duct 12.

OPERATION OF FIG. 2 EMBODIMENT

The overall operation of the FIG. 2 subsystem is identical to that of the FIG. 1 system; and the following will describe the operation briefly with respect to the alternative components of the FIG. 2 system.

When the thermostat 20 calls for full cooling, the actuator switch 28 is positioned to shut off the fan 30 and to shift the valve 73 to the supply position, to supply 20 psi air to the actuator 43 for the variable flow damper 71. As the thermostat calls for less cooling, the variable flow damper will be controlled by the actuator through the thermostat in the manner previously described. The back flow damper 61 in the warm air duct is closed by gravity; and additionally the cool air supply flowing from the cool air duct to the discharge duct builds up a back pressure within the discharge duct which assists in maintaining closure of the back flow damper 61, therefore preventing any mixing of air from the cool air duct 11 and the warm air duct 12.

When the thermostat calls for less cooling or more heat such that the signal pressure decreases below 7 psi, the switch 28 is closed to start the fan 30 and also to shift the valve 73 from the supply position to the vent position such that the conduit 72 is vented and supply air is no longer supplied to the actuator 43. This allows the variable flow damper 71 to close under the urging of its biasing spring. The back flow damper 61 opens with the movement of air impelled by the fan 30; and again, since the variable flow damper 71 is closed, there is no mixing of air from the warm duct 12 and the cool air duct 11.

During the reverse portion of the cycle when the thermostat is calling for less heat or increased cooling, when the signal pressure increases above the 7 psi level, the switch is opened to shut off the fan 30, and to allow the solenoid operated valve 73 to shift to the supply position. The backdraft damper 61 then closes and the variable flow damper opens and is controlled again by the thermostat 20.

METHOD

The systems described above represent two forms of apparatus for practicing methods for controlling the conditioning and delivery of air according to the invention. Such methods include some or all of the steps:

Providing a varying control signal which is responsive to temperature changes in the conditioned space, and in which the control signal changes have a relation to the temperature changes.

Providing separate cool air and warm air ducts for conveying air to a common delivery duct which delivers the air to the conditioned space.

Connecting the cool air duct to a cool air supply duct, for supplying chilled air under pressure; and connecting the warm air duct to the return plenum.

Effecting air flow alternatively, but not simultaneously, from either the cool air duct or the warm air duct to said delivery duct.

Varying the flow of air in the cool air duct between maximum and minimum volume flow conditions, in response to variations of the control signal between selected first and second levels thereof, wherein the volume of the air flow is related to the control signal level.

Effecting air flow in the warm air duct, and correspondingly preventing air flow in the cool air duct, in response to the change of the control signal in one direction from a third selected level; and effecting air flow in said cool air duct, and correspondingly preventing air flow in the warm air duct in response to change of the control signal in the opposite direction from that third selected level. More particularly this alternative flow control is effected by means of coupled discharge dampers in the warm air and cool air ducts.

Effecting flow of air in the warm air duct by means of a forced air flow device.

Increasing or decreasing the flow of air in the warm air duct by means of a two-speed forced air flow device, namely: increasing the air flow in response to a change of control signal in one direction from a fourth selected level, and decreasing the air flow in response to a signal change in the other direction from the fourth selected level.

Heating air flowing in the delivery duct in response to change of the control signal in one direction from a fifth selected level; and this is only in conjunction with the supplying of air from the warm air duct.

Detecting air flow conditions in the cool air duct; and varying the air flow in the cool air duct in response to these detected air flow conditions, in addition to the varying control signal responsive to conditioned space temperature.

The method of the invention may be practiced by systems or apparatus which are different from the above described preferred form of system.

FEATURES AND ADVANTAGES

What has been described is a novel system and method having the following features and advantages.

The cooling cycle, wherein chilled air is supplied to the conditioned space, and the heating cycle, wherein return air or additionally heated return air is supplied to the conditioned space, are completely independent of each other. This means that the volume flow for the two cycles may be quite different, resulting in energy savings for air moving accessories.

For the cooling cycle, the system uses only so much of the chilled air supplied by the parent system as is required by the thermostat. The movement of the chilled air is effected by the pressure of the parent system; and no auxiliary air moving fan is required, resulting in energy saving.

There is no mixing of chilled air with heated air, and therefore no possibility that previously chilled air will be reheated prior to delivery to the conditioned space resulting in energy waste.

Since the heating cycle is completely independent, the supply of heated return air to the conditioned space is effected by an air moving fan having only the capacity necessary for moving heated air; and accordingly the energy requirement for such fan may be reduced. Additionally, the air moving fan for the heating cycle is operative only during the heating cycle, resulting in energy saving. Additional saving may be effected by utilizing a two-speed or multi-speed air moving fan during the heating cycle.

For a particular cooling demand established by the thermostat during the cooling cycle, the chilled air is supplied at constant volume, independently of the pressure variation in the chilled air supply. This results in more uniform and more efficient space temperature control during the cooling cycle.

There are three stages of heat supply. Two stages of supply of the building generated heat are provided by the two speed of the air moving blower. The third stage is provided by the additional heating in the delivery duct.

The overall system is practical for the smooth control of temperatures in a conditioned space over the comfort range, and this control is maintained in a very energy efficient manner. While preferred embodiments of the invention have been illustrated and described, it will be understood by those skilled in the art that changes and modifications may be resorted to without departing from the spirit and scope of the invention. For example, while the described system includes pneumatically controlled actuators responding to a varying air pressure signal provided by the thermostat, it will be understood that the system may include other types of actuators responsive to other forms of varying thermostat signal.

What is claimed is:

1. A system for controlling the conditioning and delivery of air to a conditioned space comprising
    a cool air duct for connection to a cool air supply duct;
    a warm air duct for communication with a return plenum;
    a delivery duct connected to both said cool air and warm air ducts for delivering air to the conditioned space;
    a thermostat control device for providing a varying control signal related to the varying temperature of the air in the conditioned space;
    coupled discharge damper means for said cool air duct and said warm air duct, shiftable between a first condition wherein said cool air duct is open and said warm air duct is closed, and a second condition wherein said cool air duct is closed and said warm air duct is open;
    a fan disposed in said warm air duct for effecting air flow from the return plenum to said delivery duct;
    a variable flow control device disposed in said cool air duct for varying the air flow therein between maximum and minimum flow conditions;
    first actuator means responsive to said thermostat signal for controlling said variable flow control device;
    second actuator means responsive to said thermostat signal for controlling said discharge damper means and said fan;
    said second actuator means being operative in one condition to start said fan simultaneously with the opening of said warm air duct discharge damper means; and being operative in another condition to stop said fan simultaneously with the closing of said warm air duct discharge damper means.

2. A system as set forth in claim 1
    said thermostat control device including means providing a varying air pressure signal related to the varying air temperature in the conditioned space;
    said first actuator means comprising a modulating motor responsive to varying air pressure; and said second actuator means comprising a pneumatically operated electric switch.

3. A system as set forth in claim 1
    a heating device disposed in said delivery duct;
    third actuator means responsive to said thermostat signal for controlling said heating device.

4. A system as set forth in claim 1
    a flow responsive control device, responsive to air flow conditions in said cool air duct, for controlling said variable flow control device to maintain constant volume; said flow responsive control device controlling said first actuator in conjunction with said thermostat signal.

5. A system as set forth in claim 4
    said flow responsive control device being responsive to both static air pressure and velocity air pressure in said cool air duct, for opening up said variable flow control device in response to a decrease in air volume flow, and for closing down said variable flow control device in response to an increase in air volume flow.

6. A system as set forth in claim 1
    said thermostat control device providing a variable control signal ranging between a first level and a fifth level, including intermediate second, third and fourth levels;
    said first actuator means being responsive to a signal changing from said first level toward said second level to effect reduction of the air flow in said cool air duct, and being responsive to a signal changing from said second level toward said first level to effect increase of the air flow in said cool air duct;
    said second actuator means being responsive to a level of said thermostat signal below said third level to effect shifting of said discharge damper means to said second condition and to effect the starting of the fan, and being responsive to a level of said signal above said third level to effect shifting of said discharge damper means to said first condition and to effect the stopping of said fan.

7. A system as set forth in claim 3
    said thermostat control device providing a variable control signal ranging between a first level and a fifth level, including intermediate second, third and fourth levels;
    said first actuator means being responsive to a signal changing from said first level toward said second level to effect reduction of the air flow in said cool air duct, and being responsive to a signal changing from said second level toward said first level to effect increase of the air flow in said cool air duct;
    said second actuator means being responsive to a level of said thermostat signal below said third level to effect shifting of said discharge damper means to said second condition and to effect the starting of the fan, and being responsive to a level of said signal above said third level to effect shifting of said discharge damper means to said first condition and to effect the stopping of said fan;
    said third actuator means being responsive to a level of said thermostat signal below said fifth level to effect the energization of said heating device, and being responsive to a level of said thermostat signal above said fifth level to effect the de-energization of said heating device.

8. A system as set forth in claim 1
    said fan comprising a two-speed fan;
    and fourth actuator means responsive to said thermostat signal for shifting between high and low fan speeds.

9. A system as set forth in claim 8
    said thermostat control device providing a variable control signal ranging between a first level and a fifth level, including intermediate second, third and fourth levels;
    said first actuator means being responsive to a signal changing from said first level toward said second level to effect reduction of the air flow in said cool air duct, and being responsive to a signal changing from said second level toward said first level to effect increase of the air flow in said cool air duct;
    said second actuator means being responsive to a level of said thermostat signal below said third level to effect shifting of said discharge damper means to said second condition and to effect the starting of the fan, and being responsive to a level of said signal above said third level to effect shifting of said discharge damper means to said first condition and to effect the stopping of said fan;

said fourth actuator means being responsive to a level of said thermostat signal above said fourth level to shift said fan to said low speed condition, and being responsive to a level of said signal below said fourth level to shift said fan to said high speed condition.

10. A system for controlling the conditioning and delivery of air to a conditioned space comprising a cool air duct for connection to a cool air supply duct;

a warm air duct for communication with a return plenum;

a delivery duct connected to both said cool air and warm air ducts for delivering air to the conditioned space;

a thermostat control device for providing a varying control signal related to the varying temperature of the air in the conditioned space;

damper means for said warm air duct for allowing air flow from the return plenum to said delivery duct and for preventing reverse flow therein;

a fan disposed in said warm air duct for effecting air flow from the return plenum to said delivery duct;

variable flow control damper means disposed in said cool air duct for varying the air flow therein between maximum flow and no flow conditions;

first actuator means responsive to said thermostat signal for controlling said variable flow control damper means;

second actuator means responsive to said thermostat signal for controlling said damper means and said fan;

said second actuator means being operative in one condition to start said fan simultaneously with the closing of said cold air duct damper means; and being operative in another condition to stop said fan simultaneously with the opening of said cold air duct damper means.

11. A system as set forth in claim 10 said thermostat control device including means providing a varying air pressure signal related to the varying air temperature in the conditioned space; said first actuator means comprising a modulating motor responsive to varying air pressure; and said second actuator means comprising a pneumatically operated electric switch.

12. A system as set forth in claim 10 a heating device disposed in said delivery duct;

third actuator means responsive to said thermostat signal for controlling said heating device.

13. A system as set forth in claim 10 a flow responsive control device, responsive to air flow conditions in said cool air duct, for controlling said variable flow control device to maintain constant volume; said flow responsive control device controlling said first actuator in conjunction with said thermostat signal.

14. A system as set forth in claim 13 said flow responsive control device being responsive to both static air pressure and velocity air pressure in said cool air duct, for opening up said variable flow control device in response to a decrease in air volume flow, and for closing down said variable flow control device in response to an increase in air volume flow.

15. A system as set forth in claim 10 said thermostat control device providing a variable control signal ranging between a first level and a fifth level, including intermediate second, third and fourth levels;

said first actuator means being responsive to a signal changing from said first level toward said second level to effect reduction of the air flow in said cool air duct, and being responsive to a signal changing from said second level toward said first level to effect increase of the air flow in said cool air duct;

said second actuator means being responsive to a level of said thermostat signal below said third level to effect the closing of said variable flow control damper means and to effect the starting of said fan, and being responsive to a level of said signal above said third level to effect the opening of said variable flow control damper means and to effect the stopping of said fan.

16. A system as set forth in claim 12 said thermostat control device providing a variable control signal ranging between a first level and a fifth level, including intermediate second, third and forth levels;

said first actuator means being responsive to a signal changing from said first level toward said second level to effect reduction of the air flow in said cool air duct, and being responsive to a signal changing from said second level toward said first level to effect increase of the air flow in said cool air duct;

said second actuator means being responsive to a level of said thermostat signal below said third level to effect the closing of said variable flow control damper means and to effect the starting of the fan, and being responsive to a level of said signal above said third level to effect the opening of said variable flow control damper means and to effect the stopping of said fan;

said third actuator means being responsive to a level of said thermostat signal below said fifth level to effect the energization of said heating device, and being responsive to a level of said thermostat signal above said fifth level to effect the de-energization of said heating device.

17. A system as set forth in claim 10 said fan comprising a two-speed fan;

and fourth actuator means responsive to said thermostat signal for shifting between high and low fan speeds.

18. A system as set forth in claim 17 said thermostat control device providing a variable control signal ranging between a first level and a fifth level, including intermediate second, third and fourth levels;

said first actuator means being responsive to a signal changing from said first level toward said second level to effect reduction of the air flow in said cool air duct, and being responsive to a signal changing from said second level toward said first level to effect increase of the air flow in said cool air duct;

said second actuator means being responsive to a level of said thermostat signal below said third level to effect the closing of said variable flow control damper means and to effect the starting of the fan, and being responsive to a level of said signal above said third level to effect the opening of said variable flow control damper means and to effect the stopping of said fan;

said fourth actuator means being responsive to a level of said thermostat signal above said fourth level to shift said fan to said low speed condition, and being responsive to a level of said signal below said fourth level to shift said fan to said high speed condition.

19. A system as set forth in claim 10 said damper means for said warm air duct comprising a backdraft damper; said backdraft damper opening automatically when said fan is turned on, and closing automatically when said fan is turned off.

* * * * *